May 14, 1968  R. E. GIVENS ET AL  3,383,083
PIE-BAKING AID
Filed April 12, 1966
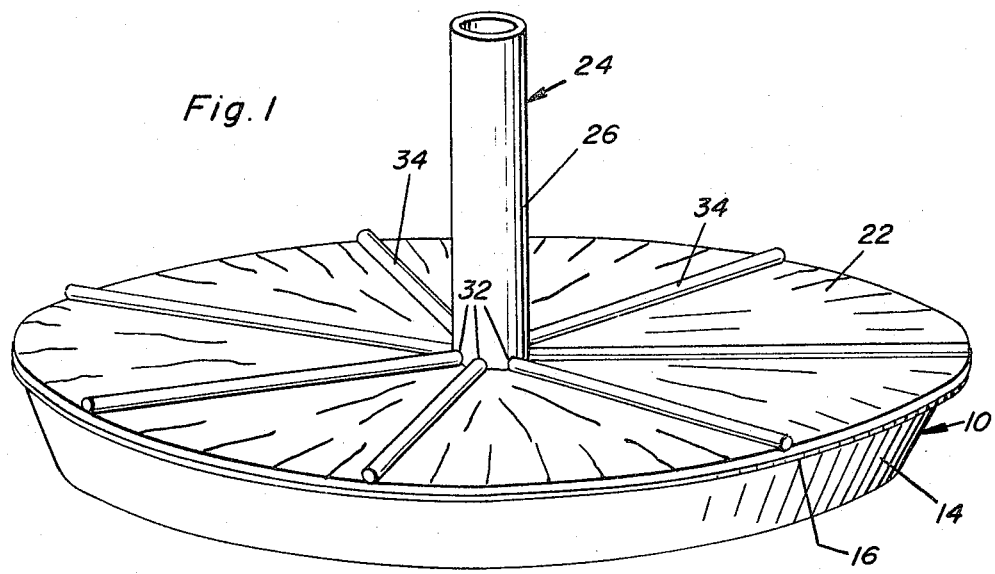
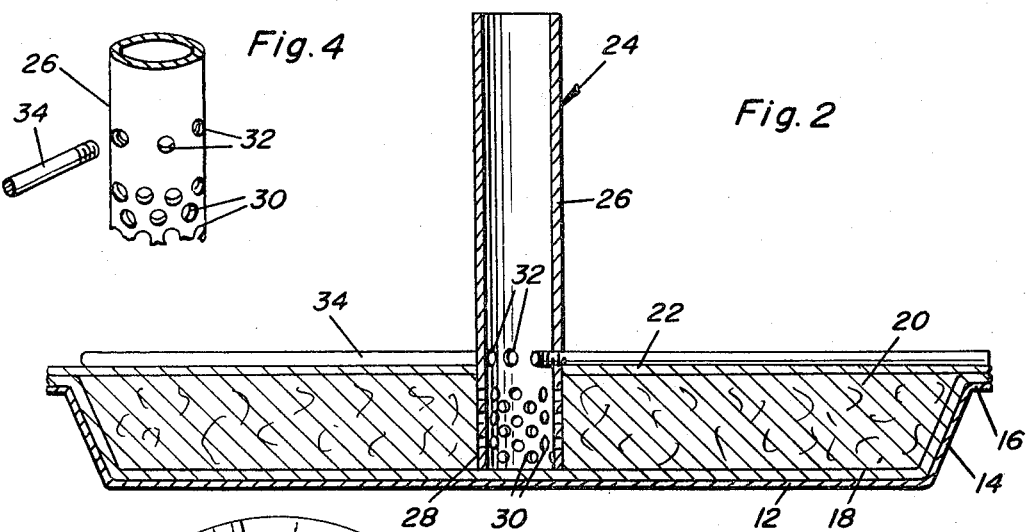
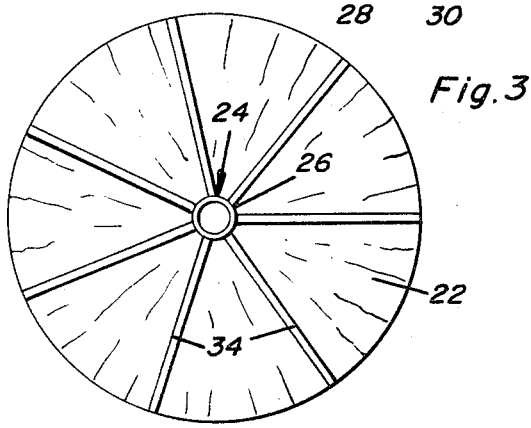
Robert E. Givens
Linda E. Givens
INVENTORS
BY Clarence A. O'Brien
and Harvey B. Jacobson
Attorneys

3,383,083
PIE-BAKING AID
Robert E. Givens and Linda E. Givens, both of R.R. 1,
S. Highway 51, Carbondale, Ill. 62901
Filed Apr. 12, 1966, Ser. No. 542,014
6 Claims. (Cl. 249—141)

This invention relates to a novel and useful pie baking aid and mores specifically to an apparatus to be utilized as a means for venting the interior of a pie beneath the top crust thereof as the pie is baking. Further, the pie baking aid of the instant invention also includes means by which the pie crust, during the baking process, will have straight radial grooves formed therein as guide lines for cutting the pie into equal segments after the pie is baked.

The main object of this invention is to provide a pie baking aid for use in baking pies and designed specifically to prevent the juices within the pie beneath the top crust from boiling over the sides of the pie during the baking process.

Another object of this invention is to provide a pie baking aid in the form of a vent with the center portion of a pie being baked and constructed in a manner whereby the juices within the pie beneath the top crust thereof may be more readily retained within the pie during the baking process.

Still another object of this invention is to provide a pie baking aid which includes means whereby the finished baked pie will have straight radial lines or grooves formed in its crust defining equal segments of the pie and which grooves may be utilized as guides when cutting the pie into equal segments.

A still further object of this invention is to provide a pie baking aid in accordance with the preceding objects which may be readily disassembled and stored in a compact manner.

A final object of this invention to be specifically enumerated herein is to provide a pie baking aid in accordance with the preceding object which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a pie with the pie baking aid of the instant invention operatively associated therewith, the pie being positioned within the pie pan in which it is to be baked;

FIGURE 2 is a vertical sectional view taken substantially upon a plane extending along a diameter of the pie and pan illustrated in FIGURE 1;

FIGURE 3 is a top plan view of the assemblage illustrated in FIGURE 1 and on somewhat of the reduced scale; and FIGURE 4 is a fragmentary exploded perspective view of a lower portion of the pie baking aid illustrating the manner in which the radial arms of the aid are removably threadedly secured in suitable threaded apertures formed in the tubular body of the aid.

Referring now more specifically to the drawings, the numeral 10 generally designates a pie pan including a generally circular bottom wall and generally upwardly and outwardly inclined peripheral wall portions 14 which terminate at their upper ends in a laterally outwardly directed and generaly horizontal annular flange portion 16. The pie pan 10 is of course conventional in configuration and may have the bottom crust 18, a pie filling 20 and a top crust 22 disposed therein in the manner illustrated in FIGURE 2 of the drawings with the bottom and top crusts 18 and 22 overlapping each other at their outer marginal edge portions and the upper surface of the flange portion 16.

The pie baking aid of the instance invention is generally referred to by the reference numeral 24 and includes an upstanding tubular body 26 which is cylindrical in configuration and which includes a lower end 28 resting upon the bottom crust 18. If it is desired, the lower end 28 of the tubular body 26 may be forced downwardly through the bottom crust 18 and rest upon the bottom wall 12 of the pan 10. However, it is desirable not to rupture the bottom crust 18 (such a rupture possibly allowing juices from the filling 20 to flow between the bottom crust 18 and the bottom wall 12) and therefore in the preferred use of the aid 24 the lower end of the tubular body 26 rests upon the upper surface of the bottom pie crust 18 without rupturing the latter.

The tubular body 26 includes a plurality of openings 30 formed therethrough and spaced above the lower end of the body 26 and below the level of the upper pie crust 22. In addition, the body 26 has a plurality of circumferentially spaced threaded apertures 32 formed therein at points spaced equally circumferentially about the body 26 and each of the apertures 32 have a corresponding end of a rod-like arm 34 threadedly secured therein.

The free ends of the arms 34 overlie the overlapped outer marginal edge portions of the bottom and top crust 18 and 22 and the flange portion 16 and the arms 34 rest upon the crust 22 throughout substantially the entire length of the arms 34. Actually, the arms 34 may be slightly spaced above those portions of the upper crust 22 disposed inwardly of the flange portions 16 before the pie is baked. However, the normal tendency of the pie to rise slightly during the baking process will lift the top crust 22 slightly upwardly and into engagement with the undersurfaces of the arms 34. Thus, the top pie crust 22 will have indentations formed therein during the baking process beneath the arms 34 and any tendency of the juices of the filling 22 to expand will result in juices being forced through the openings 30 and into the tubular body 26.

Of course, the juices from the filling 20 may rise slightly in the body 26 above the upper surface of the pie in some cases. However, by providing a small area of the pie which is not sealed by the top crust 22 for expansion, the filling 20 may rise considerably in the tubular member 26 and yet the pie crust 22 will not be separated from the pie crust 18 at the outer periphery of the pie 10 and result in juices from the filling 20 spilling over the side of the pan 10. In addition, the weight of the aid 24 and the arms 34 act as retaining means to slightly holddown the portions of the upper pie crust 22 extending beneath the arms 34 to further resist separation of the upper pie crust 22 from the lower pie crust 18 at the outer periphery of the pie.

After the aid 24 has been used and subsequently cleaned, the arms 34 may be readily separated from the tubular member 26 and inserted in the latter for storage of the aid 24 in a compact state.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A pie baking aid comprising an upright tubular member adapted to have its lower end supported from the center of a pie pan, a plurality of openings formed in said tubular member and spaced circumferentially about the lower end thereof, and a plurality of circumferentially spaced arms projecting radially outwardly of said tubular member and including outer end portions adapted to rest upon the radial outermost portions of an associated pie crust, said openings being spaced below the radial innermost ends of said arms and the later being disposed in a plane substantially normal to the longitudinal center line of said tubular member.

2. The combination of claim 1 wherein said tubular member is cylindrical in configuration.

3. The combination of claim 2 wherein said tubular member includes a plurality of circumferentially spaced threaded apertures formed therein disposed in said plane and the radial innermost ends of said arms are removably threadedly engaged in said apertures.

4. In combination with a pie pan including a bottom wall and an upstanding peripheral wall, a pie baking aid comprising an upright tubular member having its lower end resting on a central portion of said bottom wall, a plurality of openings formed in said tubular member and spaced circumferentially about the lower end thereof below a plane containing the upper edge portion of said peripheral wall, a plurality of circumferentially spaced arms projecting radially outwardly of said tubular member and including outer end portions overlying the upper edge portions of said peripheral wall, said arms being disposed in a plane substantially normal to the longitudinal center line of said tubular member.

5. The combination of claim 4 wherein said tubular member includes a plurality of circumferentially spaced threaded apertures formed therein disposed in said plane and the rigidal innermost ends of said arms are removably threadedly engaged in said apertures.

6. The combination of claim 4 wherein the upper edge portion of said peripheral wall terminates in an outwardly flange portion.

References Cited

UNITED STATES PATENTS

| | | | |
|---|---|---|---|
| 235,476 | 12/1880 | White | 249—141 X |
| 2,003,151 | 5/1935 | Lang. | |
| 3,262,668 | 7/1966 | Luker. | |

J. HOWARD FLINT, Jr., *Primary Examiner.*